(12) United States Patent
Sekino et al.

(10) Patent No.: US 7,029,420 B2
(45) Date of Patent: Apr. 18, 2006

(54) VEHICULAR STATE SWITCHING DEVICE

(75) Inventors: Yutaka Sekino, Hadano (JP); Yoko Horiuchi, Isehara (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 30 days.

(21) Appl. No.: 10/468,028

(22) PCT Filed: Sep. 20, 2001

(86) PCT No.: PCT/JP01/08178

§ 371 (c)(1),
(2), (4) Date: Jan. 27, 2004

(87) PCT Pub. No.: WO02/066279

PCT Pub. Date: Aug. 29, 2002

(65) Prior Publication Data

US 2004/0110600 A1    Jun. 10, 2004

(30) Foreign Application Priority Data

Feb. 20, 2001    (JP) ............................. 2001-042994

(51) Int. Cl.
    *B60R 25/06*    (2006.01)
(52) U.S. Cl. ....................................................... 477/99
(58) Field of Classification Search ................. 477/99; 70/245, 248, 249, 250, 251
    See application file for complete search history.

(56) References Cited

U.S. PATENT DOCUMENTS

| | | | |
|---|---|---|---|
| 2,925,076 A * | 2/1960 | Jensen et al. ................. 477/99 |
| 3,326,315 A | 6/1967 | Richards | |
| 3,590,612 A * | 7/1971 | Henning ....................... 70/251 |
| 3,901,097 A * | 8/1975 | Williams et al. .............. 70/248 |
| 5,528,953 A | 6/1996 | Steinle et al. | |
| 6,059,687 A | 5/2000 | Durieux et al. | |
| 6,203,469 B1 * | 3/2001 | Fujinuma ...................... 477/99 |
| 6,295,887 B1 * | 10/2001 | DeJonge et al. .............. 477/99 |
| 6,500,092 B1 * | 12/2002 | Syamoto ....................... 477/99 |
| 6,810,700 B1 * | 11/2004 | Okuno ........................ 70/252 |

FOREIGN PATENT DOCUMENTS

| | | |
|---|---|---|
| DE | 197 47 269 A1 | 4/1999 |
| EP | 0 619 446 A1 | 10/1994 |
| JP | 04-254050 | 9/1992 |
| JP | 04-254066 | 9/1992 |
| JP | 08-40209 | 2/1996 |
| JP | 10-244853 * | 9/1998 |
| JP | 10-315915 | 12/1998 |
| JP | P2001-63395 | 3/2001 |
| JP | P2001-80383 | 3/2001 |
| JP | P2001-277893 | 10/2001 |
| WO | WO 00/41907 | 7/2000 |

* cited by examiner

*Primary Examiner*—Sherry Estremsky
(74) *Attorney, Agent, or Firm*—McDermott Will & Emery LLP (57) ABSTRACT

A vehicle status change-over device is disclosed wherein an ignition switch 4 and a case 5 are fixed to a steering column cover, a case 5 supports a rotator 6 for rotational movement while fixing a shift position switch 8, a dial 9 is mounted to the case 5 for rotational movement about a center on substantially the line as a rotational center of the rotator 6, a shift lock solenoid 15 is mounted to an outer periphery of the case 5 at an area corresponding to a bore 14, and a lock pin 6 is provided to be moveable with the shift lock solenoid 15.

7 Claims, 11 Drawing Sheets

| | | DIAL POSITION | | | | | | | |
|---|---|---|---|---|---|---|---|---|---|
| | | OFF | | P | | R | | N | D |
| OUTPUT SIGNAL | "P" POSITION SIGNAL | | | ////  | | | | | |
| | "R" POSITION SIGNAL | | | | | //// | | | |
| | "N" POSITION SIGNAL | | | | | | | //// | |
| | "D" POSITION SIGNAL | | | | | | | | //// |

VEHICULAR STATE SWITCHING DEVICE

TECHNICAL FIELD

The present invention relates to a vehicle status change-over device having at least shift position switch for a vehicle.

BACKGROUND ART

With a related art vehicle status change-over device, as disclosed in Japanese Patent Provisional Publication No. 08-40209, a shift of a power transmission is changed over through rotation and parallel movement of a compound key element of an ignition device.

DISCLOSURE OF INVENTION

However, with such a vehicle status change-over device, since there is a need for performing two different kinds of operations, such as the rotation and the parallel movement, of the compound key element, the operation becomes complicated. Further, since a space is required for permitting the parallel movement of the compound key element, a layout of a shift operating section of the vehicle shift change-over device is restricted.

The present invention has been completed with a view to addressing an issue set forth above and has an object to provide a vehicle status change-over device which is easy to operate and has an increased degree of freedom in a layout of a shift operating section of the vehicle status change-over device.

To achieve such an object, according to a first aspect of the present invention, there is provided a vehicle status change-over device comprising a rotational member rotatable about a center of a given rotational axis, an ignition switch operative to select at least an engine start-up interruptive status and an engine start-up permit status in dependence on a rotational position of the rotational member, a dial located for rotational movement about a center on the substantially same line as a rotational center of the rotational member, and a shift position switch selecting a shift position of a power transmission in dependence on a rotational position of the dial.

Further, according to a second aspect of the present invention, there is provided a vehicle status change-over device comprising a dial disposed for rotational movement, a shift position switch selecting a shift position of a power transmission in dependence on a rotational position of the dial, a second shift lock section operative to prevent the dial from being rotated to retain the shift position switch in an off position and to release the off position of the shift position switch when ID information of an electronic key coincides with given ID information, and an engine control unit operative to start up an engine when the shift position switch assumes a parking position.

Stated another way, the first aspect of the present invention provides a vehicle status change-over device comprising a rotational member rotatable about a center of a given rotational axis, an ignition switch operative to select at least an engine start-up interruptive status and an engine start-up permit status in dependence on a rotational position of the rotational member, a dial located for rotational movement about a center on the substantially same line as a rotational center of the rotational member, and shift position selecting means for selecting a shift position of a power transmission in dependence on a rotational position of the dial.

Similarly, expressed another way, the second aspect of the present invention provides a vehicle status change-over device comprising a dial located for rotational movement, shift position selecting means for selecting a shift position of a power transmission in dependence on a rotational position of the dial, second shift lock section means operative to prevent the dial from being rotated to retain the shift position switch in an off position and to release the off position of the shift position switch when ID information of an electronic key coincides with given ID information, and engine control means operative to start up an engine when the shift position selection means assumes a parking position.

BEST MODE FOR CARRYING OUT THE INVENTION

Figure 1:
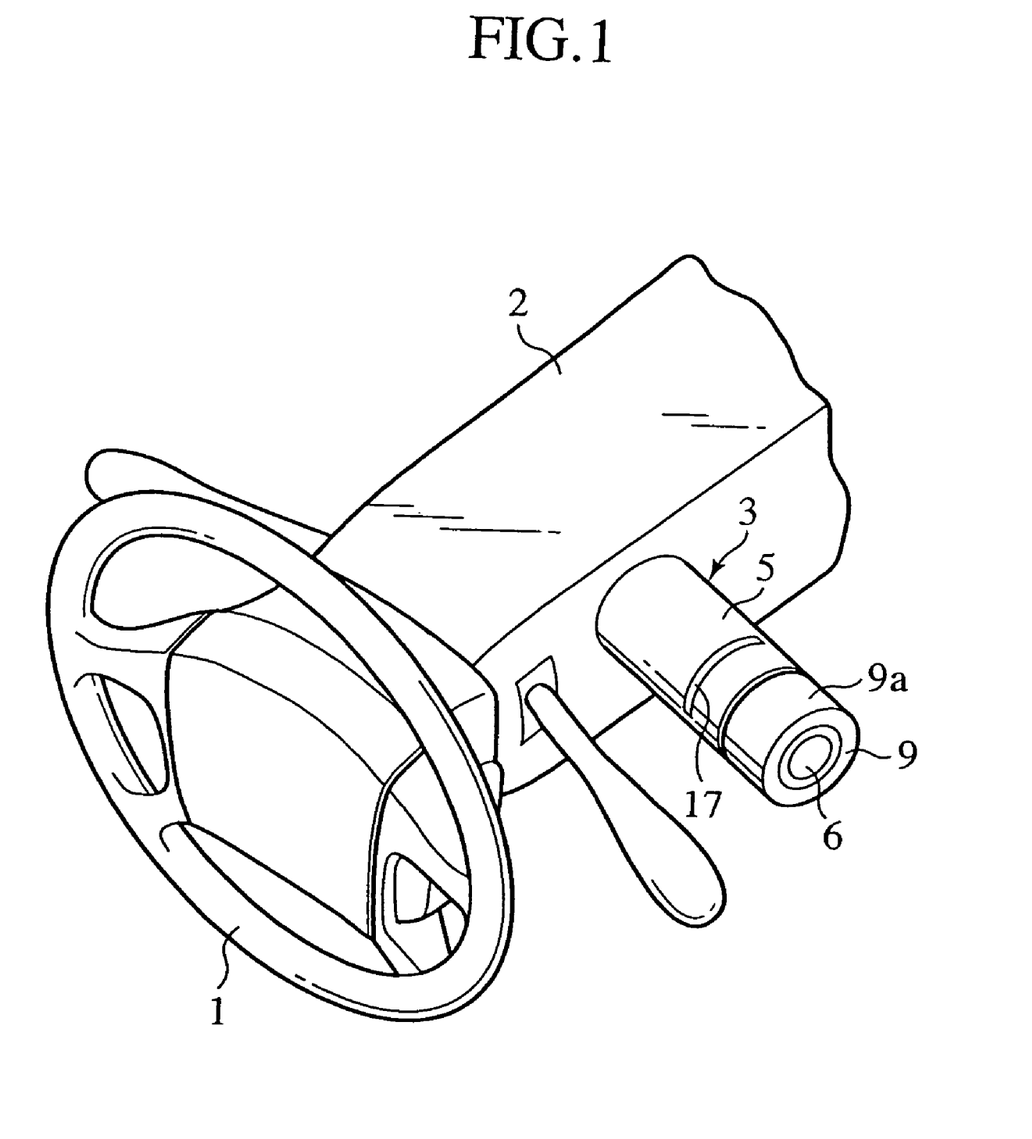
FIG. 1 is a perspective view illustrating a vehicle status change-over device according to the present invention.
Figure 2:
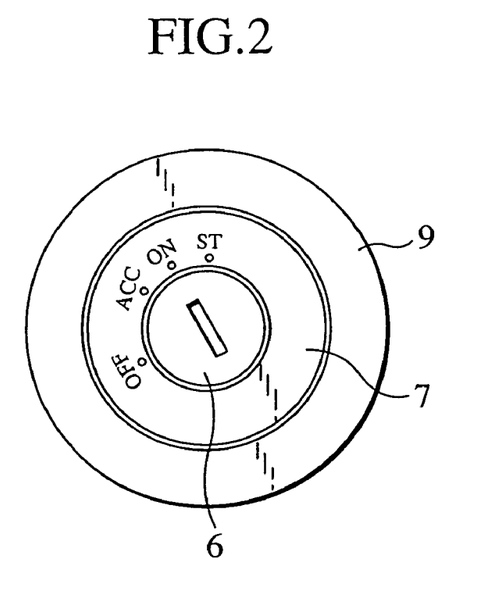
FIG. 2 is a view illustrating a portion of the vehicle status change-over device shown in FIG. 1.
Figure 3:
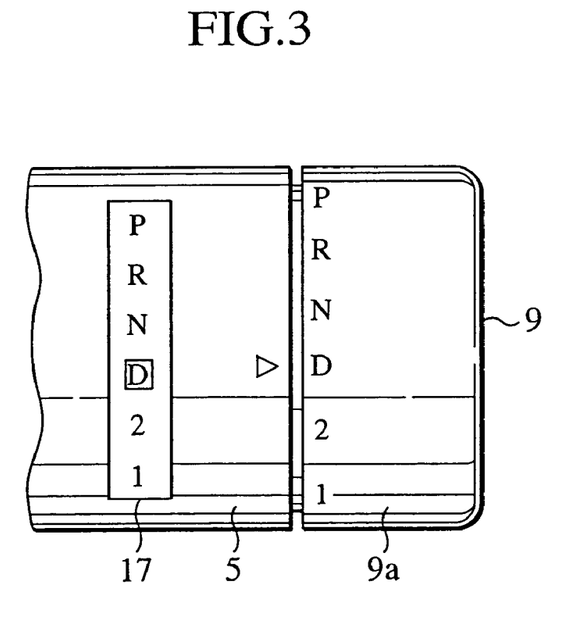
FIG. 3 is a view illustrating a portion of the vehicle status change-over device shown in FIG. 1.
Figure 4:
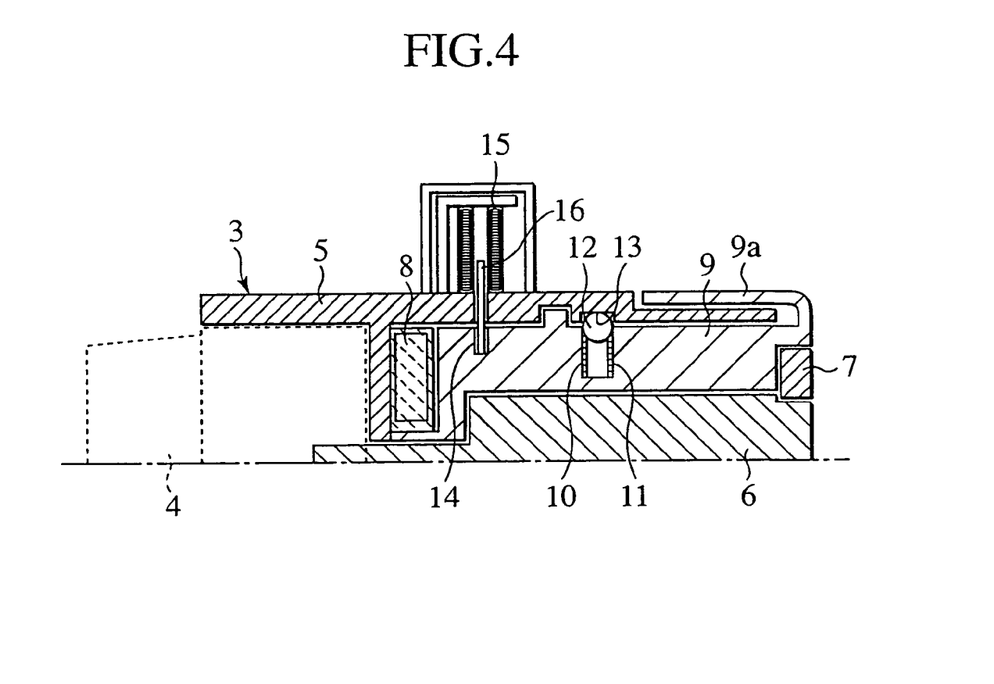
FIG. 4 is a half cross sectional view illustrating a first embodiment of a vehicle status change-over device according to the present invention.
Figure 5:
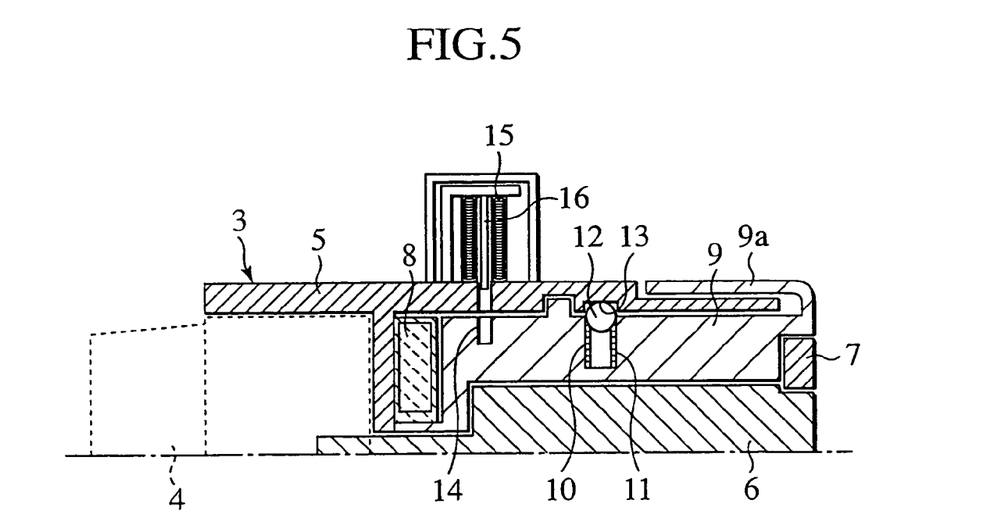
FIG. 5 is a view illustrating an operation of the vehicle status change-over device shown in FIGS. 1 to 4.

FIG. 1 is a perspective view of a vehicle status change-over device according to the present invention. Further, FIG. 2 is a view illustrating a part of the vehicle status change-over device shown in FIG. 1. And, FIG. 3 is a view illustrating a part of the vehicle status change-over device shown in FIG. 1. Furthermore, FIG. 4 is a half cross sectional view illustrating a first embodiment of the vehicle status change-over device according to the present invention. As shown in FIGS. 1 to 4, fixed to a steering column cover 2 of a steering wheel 1 are an ignition key switch 4 and a substantially cylindrical key cylinder case 3. The key cylinder case 5 encompasses a rotator (rotational member) 6 of a key cylinder. Also, the rotator 6 is supported in the case 5 for rotational movement about a given rotational axis and connected to the ignition switch 4. Further, a distal end face (at a rightward end in a sheet of FIG. 4) is placed with a ring shaped display segment 7. The display segment 7 is fixed to the case 7 at areas which are not shown with it's front face is provided with a display of "OFF", "ACC", "ON" and "ST". And, the ignition switch 4, the case 5, the rotator 6 and the display segment 7 form an ignition switch device 3. When an ignition key (not shown) inserted to a key hole of the rotator 6 remains in the "OFF" display position, the ignition switch 4 assumes an "OFF" position (an engine start-up interruptive status) with a battery power supply being disconnected with either one of an ignition (IGN) contact, an accessory (ACC) contact and a start (ST) contact. And, when the ignition key remains in the "ACC" display position, the ignition switch 4 assumes the "ACC" position with the battery power supply being connected to the accessory contact. Further, when the ignition key remains in the "ON" display position, the ignition switch 4 assumes an "ON" position (engine start up permit status) with the battery power supply being connected to the ignition contact and the accessory contact. Further, when the ignition key remains in the "ST" display position, the ignition switch 4 assumes an "ST" position with the battery power supply being connected to the ignition contact and the start contact. That is, the ignition switch 4 is operative to select at least the engine start-up interruptive status and the engine start-up permit status in dependence on a rotational angular position of the rotator 6. Furthermore, a shift position switch 8 is held stationary in the case 5. And, a cylindrical shaped dial 9 is mounted in the case 5 for rotational movement about an axis approximately coincident with a rotational center of the rotator 6. Also, the dial 9 is disposed in the case 5 and connected to the shift position switch 8. Thus, the shift position switch 8 and the dial 9 form a shift operating section of a vehicle shift change-over device. The shift position switch 8 is operative to select a shift position of a power transmission in dependence on a rotational position of the dial 9. And, a distal end (at a rightward end in the sheet of FIG. 4) is formed with a cylindrical shaped rotational operator segment 9a in a way to assume an outward position of the case 5. Further, a distal end portion, closer to the steering column cover 2 (at a leftward position in a sheet of FIG. 3), of an outer peripheral surface of the rotational operator segment 9a is provided with displays of "P", "R", etc. indicative of shift positions. Further, an outer periphery of the dial 9 is provided with a display of a triangle symbol at a position opposing to the above display. And, an outer periphery of the dial 9 is formed with a bore 10 with its central axis extending in a radial direction (in a vertical direction in the sheet of FIG. 4). Further, a spring 11 and a ball 12 are disposed in the bore 10. Furthermore, a plurality of concave portions 13 are formed on an inner periphery of the case 3 at circumferentially spaced positions corresponding to the above display of the rotational operator segment 9a. The ball 12 is operative to engage one of the concave portions 13 and, when the ball 12 engages the concave portion 13, selected one of the above displays of "P", "R", etc. of the rotational operator segment 9a is positioned in opposed relation to the above described triangle symbol. Thus, the spring 11, the ball 12 and the plural concave portions 13 form a positioning section of the dial 9. Also, the outer periphery of the dial 9 is formed with a bore 14. Further, a shift lock solenoid 15 is mounted to the case 5 at an area corresponding to the bore 14 when the shift position switch 8, disposed inside the case 5, assumes the "P" position (parking position), and a lock pin 16 is inserted through the case 5 to be movable with the shift lock solenoid 15. Thus, the bore 14, the shift lock solenoid 15 and the lock pin 16 form a first shift lock section to preclude the dial 9 from being rotated in a case where the ignition switch 4 is selected in the engine start-up interruptive status. As shown in FIG. 4, when the ignition switch 4 assumes the "OFF" position and the "ACC" position, the lock pin 16 is not attracted with the shift lock solenoid 15. On the contrary, as shown in FIG. 5, when the ignition switch 4 is moved to the "ON" position and the "ST" position, the lock pin 16 is attracted with the shift lock solenoid 15. Further, the outer periphery of the case 5 is placed with an indicator 17 of the vehicle shift change-over device with the indicator 17 being provided with displays of "P", "R", etc. and photo diodes are located in opposed positions of the displays of "P", "R", etc.

Figure 6:
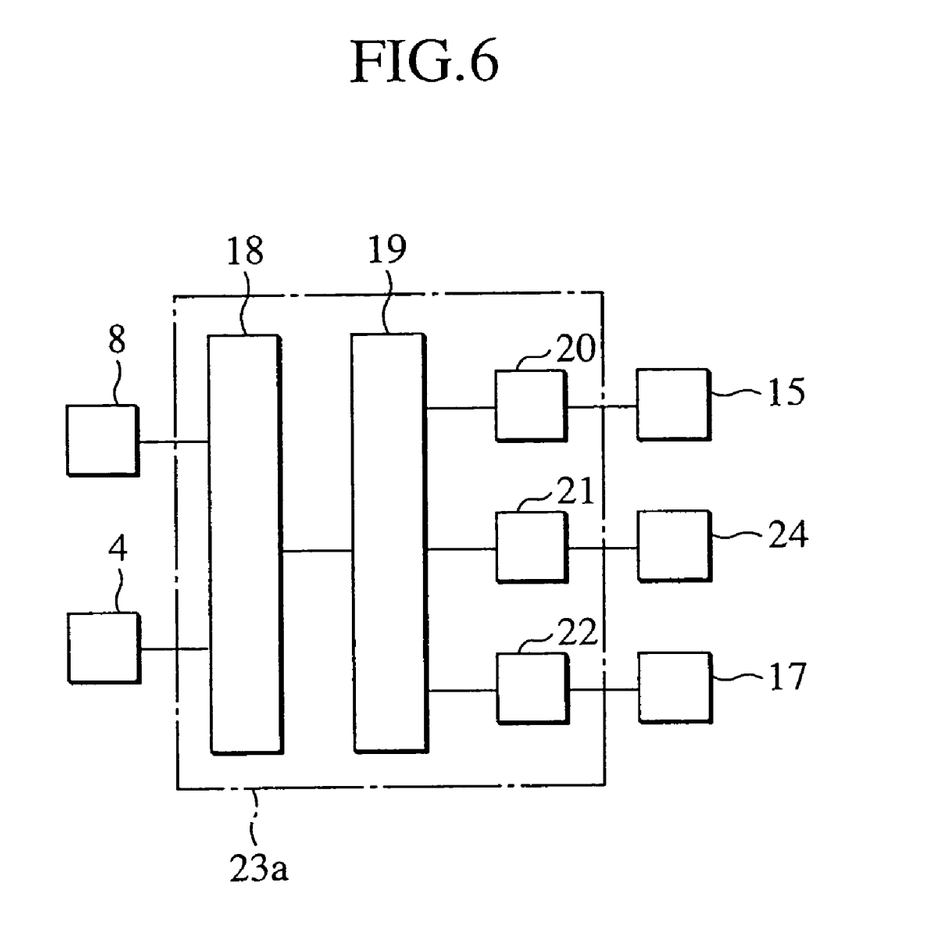
FIG. 6 is a circuit diagram of the vehicle status change-over device shown in FIGS. 1 to 4.

FIG. 6 is a circuit diagram of the vehicle status change-over device shown in FIGS. 1 to 4. As shown in FIG. 6, connected to an input interface 18 are the ignition switch 4, the shift position switch 8 and a computing section (microcomputer) 19. And, a shift lock solenoid output circuit 20, an actuator output circuit 21 and an indicator output circuit 22 are connected to the computing section 19. Also, connected to the shift lock solenoid output circuit 20 is the shift lock solenoid 15. Further, connected to the actuator output circuit 21 is a shift change-over actuator 24. Further, connected to the indicator output circuit 22 is the photo diode of the indicator 17. And, the input interface 18, the computing section 19, the shift lock solenoid output circuit 20, the actuator output circuit 21 and the indicator output circuit 22 form a shift control unit 23a.

With such a vehicle status change-over device, since the rotator 6 of the key cylinder is connected to the ignition switch 4, the rotation of the rotator 6 effectuated with the ignition key enables the ignition switch 4 to be changed over. And, as shown in FIG. 4, when the ignition switch 4 remains in the "OFF" position and "ACC" position, the lock pin 16 is not attracted with the shift lock solenoid 15. As a consequence, the lock pin 16 engages the bore 14, and under a condition where the ignition switch 8 is moved to the "P" position, the dial 9 is disenabled to rotate. That is, in an event that the ignition switch 4 assumes a selected position of the engine start-up interruptive status, the first shift lock section is driven. Also, as shown in FIG. 5, when the ignition switch 4 assumes the "ON" position and the "ST" position, the lock pin 16 is attracted with the shift lock solenoid 15. Accordingly, the lock pin 16 disengages the bore 14, and the dial 9 is rendered rotatable. Further, if the dial 9 is rotated with the rotational operator segment 9a with the dial 9 remaining in the rotatable status, then, the shift position switch 8 comes to be changed over due to the connection between the dial 9 and the shift position switch 8. When this takes place, a control signal is transmitted from the actuator output circuit 21 to the shift change-over actuator 24, by which the shift is changed over in the power transmission. In this instance, the photo diode of the indicator 17 is lighted according to the position of the dial 9.

With such a vehicle status change-over device, the rotation of the rotator 6 of the key cylinder enables the engine to be started up, and the rotation of the dial 9, which is substantially positioned in alignment with the rotational center of the rotator 6, enables the shift to be changed over in the power transmission. As a result, it is possible to perform an identical motion with a single hand for a motion starting from the start up of the engine to the selection of the of the shift position, i.e., the motion to initiate the running of the vehicle, thereby providing an ease of operation. Further, since the dial 9 is rotated to enable the shift of the power transmission to be changed over, no space for parallel movement of the ignition key is required, resulting in an increased degree of freedom for a layout of the shift operating section of the vehicle shift change-over device. Also, the presence of the first shift lock section disabling the rotation of the dial 9, when the ignition switch 4 assumes the "OFF" position and "ACC" position, provides a capability of preventing the dial 9 from being erroneously operated.

Figure 7:
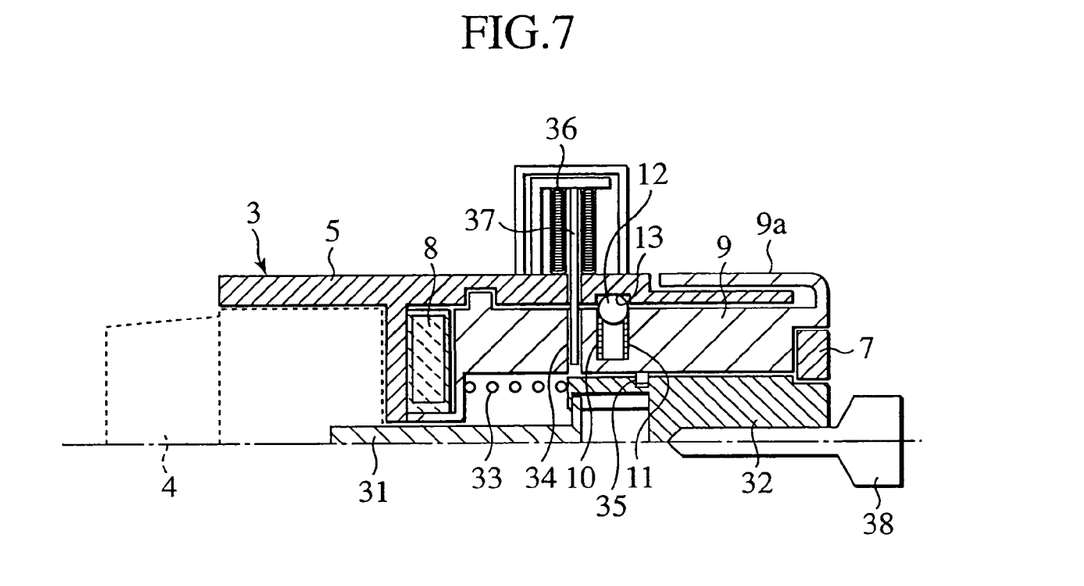
FIG. 7 is a half cross sectional view illustrating a second embodiment of a vehicle status change-over device according to the present invention.
Figure 8:
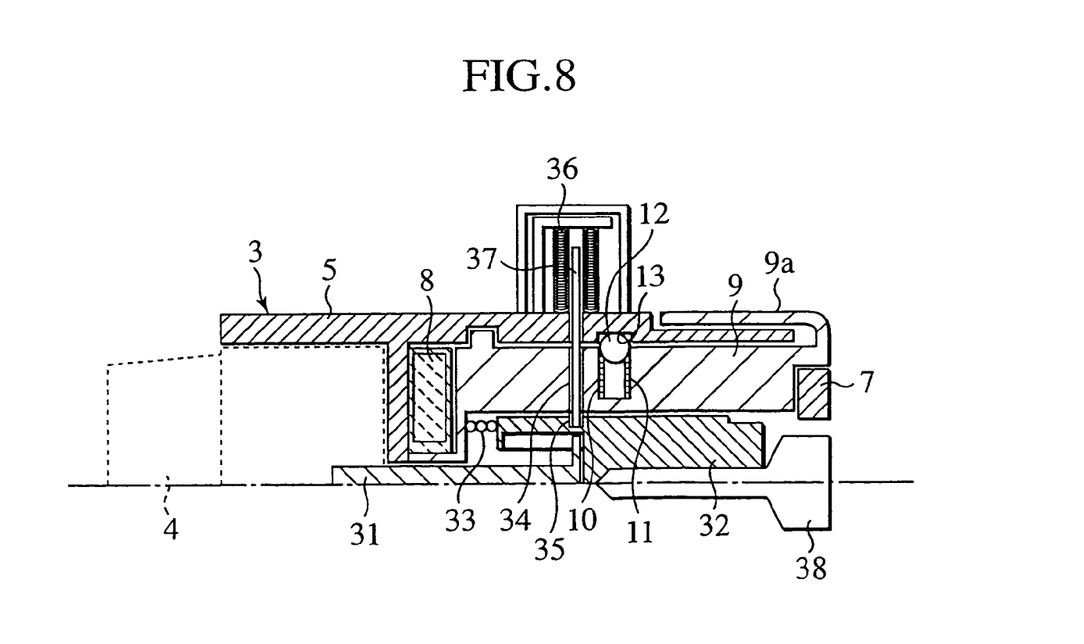
FIG. 8 is a view illustrating an operation of the vehicle status change-over device shown in FIG. 7.

FIG. 7 is a half cross sectional view illustrating a second embodiment of a vehicle status change-over device according to the present invention. As shown in FIG. 7, a first rotator 31 is disposed in the case 5 of the key cylinder. And, the first rotator 31 is supported with the case 5 of the key cylinder for rotational movement and connected to the ignition switch 4. Also, a second rotator 32 of the key cylinder is supported with the dial 9 for rotational movement. Further, the second rotator 32 is connected to the first rotator 31 in such a way that the second rotator 17 is relatively moveable along an axial direction (leftward and rightward direction in a sheet of FIG. 7) but is inoperative to relatively rotate about a center of an axis in the leftward and rightward direction in the sheet of FIG. 7. And, a spring 33 is disposed between the dial 9 and the second rotator 32. Further, the dial 9 is formed with a sector slit penetration 34 extending perpendicular to the center line. Further, an outer periphery of the second rotator 32 is formed with a bore 35. Furthermore, a push lock solenoid 36 is mounted at an area corresponding to the slit penetration 34 of the outer periphery of the case 5, and a lock pin 37 adapted to be moveable with the push lock solenoid 36 is provided. And, the bore 35, the push lock solenoid 36 and the lock pin 37 form a push lock section (retainer section) which is operative to retain a rear end of the second rotator 32 in a retracted position when the shift position switch 8 assumes the position except the "P" position and to be released when the shift position switch 8 assumes the "P" position. As shown in FIG. 7, if the shift position switch 8 assumes the "P" position, then, the lock pin 37 is attracted with the push lock solenoid 36. On the contrary, as shown in FIG. 8, if the shift position switch 8 assumes the position except the "P" position, then, the lock pin 37 is not attracted with the push lock solenoid 36. Also, though not shown in the figures, the vehicle status change-over device of the presently filed embodiment includes the first shift lock section like in the embodiment shown in FIGS. 1 to 4.

Figure 9:
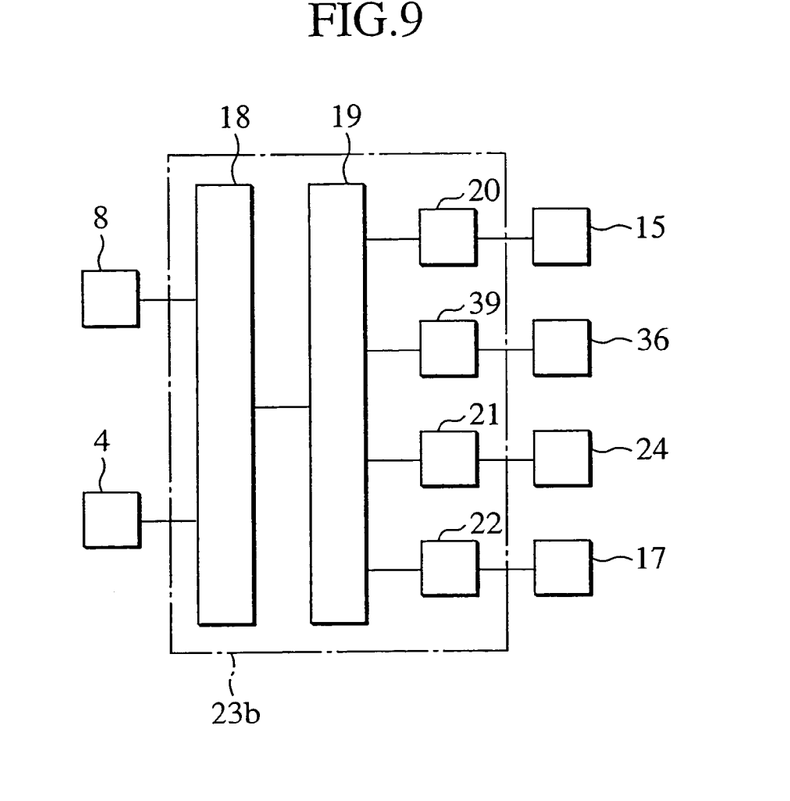
FIG. 9 is a circuit diagram of the vehicle status change-over device shown in FIG. 7.

FIG. 9 is a circuit diagram of the vehicle status change-over device shown in FIG. 7. As shown in FIG. 9, connected to the computing section 19 is a push lock solenoid output circuit 39. Further, connected to the push lock solenoid output circuit 39 is the push lock solenoid 36. And, the input interface 18, the computing section 19, the shift lock solenoid output circuit 20, the push lock solenoid output circuit 39, the actuator output circuit 21 and the indicator output circuit 22 form a shift control unit 23b.

With such a vehicle status change-over device, the first rotator 31 is connected to the ignition switch 4. Further, the second rotator 32 is connected to the first rotator 31 to be disabled for relative rotation. Accordingly, if the second rotator 32 is rotated with the ignition key 38, then, it is possible to change over the ignition switch 4. And, as shown in FIG. 7, when the shift position switch 8 assumes the "P" position, the lock pin 37 is attracted with the push lock solenoid 36. Consequently, even if the second rotator 23 is depressed (moved leftward in a sheet of FIG. 7), the lock pin 37 is out of engagement with the bore 35. Further, as shown in FIG. 8, when the shift position switch 8 assumes the position except the "P" position, the lock pin 37 is not attracted with the push lock solenoid 36. Accordingly, if the second rotator 32 is depressed rearward with the ignition key 38 against the force of the spring 33, the lock pin 37 is brought into engagement with the bore 35, thereby enabling the ignition key 38 to be accommodated in the case 5. Further, as shown in FIG. 7, when, in such a condition, the dial 9 is rotated to cause the shift position switch 8 to assume the "P" position, the lock pin 37 is attracted with the push lock solenoid 36. As a consequence, the lock pin 37 disengages the bore 35 to allow the second rotator 32 to be depressed with the spring 33 to cause the second rotator 32 to restore the position shown in FIG. 7, thereby enabling the ignition key 38 to be operated. Namely, the retaining section is released when the shift position switch 8 assumes the "P" position.

With such a vehicle status change-over device, when the shift position switch 8 assumes the position except the "P" position, the second rotator 32 is able to accommodate the ignition key 38 within the case 5. As a result, when rotating the dial 9, disposed around the peripheries of the rotators for selective operation of the shift position of the power transmission, after starting up the engine by rotating the rotators 31, 32, since the ignition key 38 inserted to the key hole of the rotator 32 is able to preclude the rotational operation of the dial 9 from being interrupted.

Further, when the ignition key 38 assumes the "P" position, since the position of the second rotator 32 is restored to its original position, it is possible to smoothly perform the operation to rotate the ignition key 38 to allow the ignition switch 4 to assume the "OFF" position.

Figure 10:
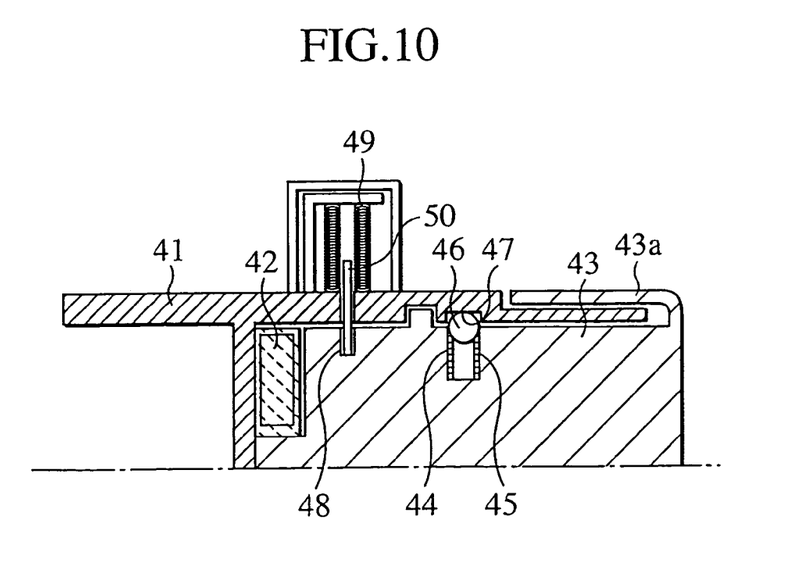
FIG. 10 is a half cross sectional view illustrating a third embodiment of a vehicle status change-over device according to the present invention.
Figure 11:
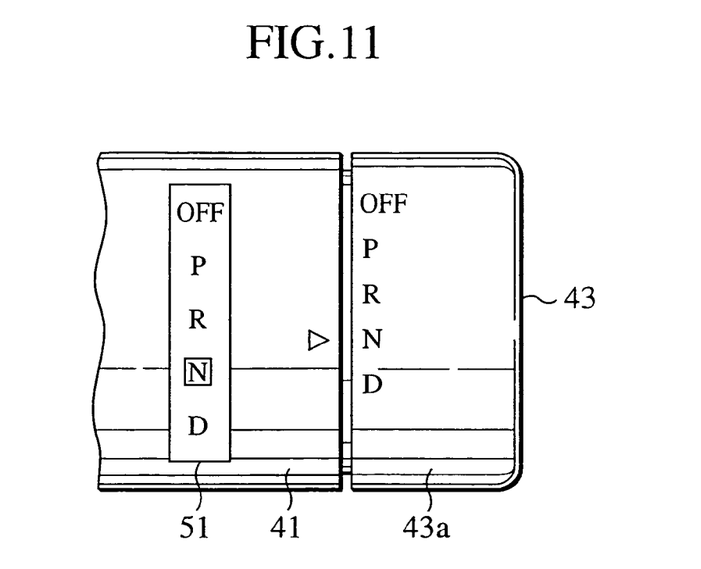
FIG. 11 is a view illustrating a portion of the vehicle status change-over device shown in FIG. 10.

FIG. 10 is a half cross sectional view illustrating a third embodiment of a vehicle status change-over device according to the present invention. Further, FIG. 11 is a view illustrating a portion of the vehicle status change-over device shown in FIG. 10. As shown in FIGS. 10 and 11, a substantially cylindrical shaped case 41 is fixed to the steering column cover 2 (see FIG. 1). And, a shift position switch 42 is fixed to the case 41. Also, a dial 43 is mounted to the case 41. Further, the case 41 serving as a support member supports the cylindrical dial (rotational operation knob) 43 for rotational movement thereof and is connected to a shift position switch 42. The shift position switch 42 and the dial 43 form a shift operating section of the vehicle status change-over device. The shift position switch 42 is operative to select the shift position of the power transmission in dependence on the rotational position of the dial 43. And, a distal end (rightward end portion in a sheet of FIG. 11) of the dial 43 is formed with a rotational operator segment 43a, which is located outside the case 41. Further, a distal end portion, closer to the steering column cover 2 (at a leftward position in a sheet of FIG. 11), of an outer peripheral surface of the rotational operator segment 43a is provided with displays of "OFF", "P", "R", etc. indicative of the shift positions. Further, an outer periphery of the case 41 is provided with a display of a triangle symbol at a position opposing to the above display of the rotational operator segment 43a. Further, the outer periphery of the case 41 is placed with an indicator 51 of the vehicle shift change-over device. Also, the indicator 51 is provided with displays of "OFF", "P", "R", etc. and photo diodes are located in opposed positions of the displays of "OFF", "P", "R", etc. Further, an outer periphery of the dial 43 is formed with a bore 44 with its center line extending in a radial direction (vertical direction in a sheet of FIG. 10). Furthermore, a spring 45 and a ball 46 are inserted in the bore 44. Further, a plurality of convex portions 47 are formed on an inner periphery of the case 41 at positions corresponding to the above described display. The ball 46 engages one of the convex portions 47 and, when the ball engages the convex portion 47, selected one of "P", "R", etc. displays of the rotational operator segment 43a is positioned at an area opposing to the triangle symbol set forth above. The spring 45, the ball 46 and the plural convex portions 47 form a positioning section of the dial 43. Further, the outer periphery of the dial 43 is formed with a bore 48. And, a shift lock solenoid 49 is mounted to the outer periphery of the case 41 at an area corresponding to the bore 48 when the shift position switch 42 assumes the "OFF" position (off position), and a lock pin 50 is inserted through the case 41 to be moveable with the shift lock solenoid 49. Also, as shown in FIG. 10, under a condition where the lock pin 50 is not attracted with the shift lock solenoid 49, the dial 43 is enabled to slightly rotate. The bore 48, the shift lock solenoid 49 and the lock pin 50 form a second shift lock section that precludes the rotation of the dial 43 to retain the shift position switch 42 in an off position and when ID information of an electronic card key is aligned with given ID information, the retaining of the off position is released.

Figure 12:
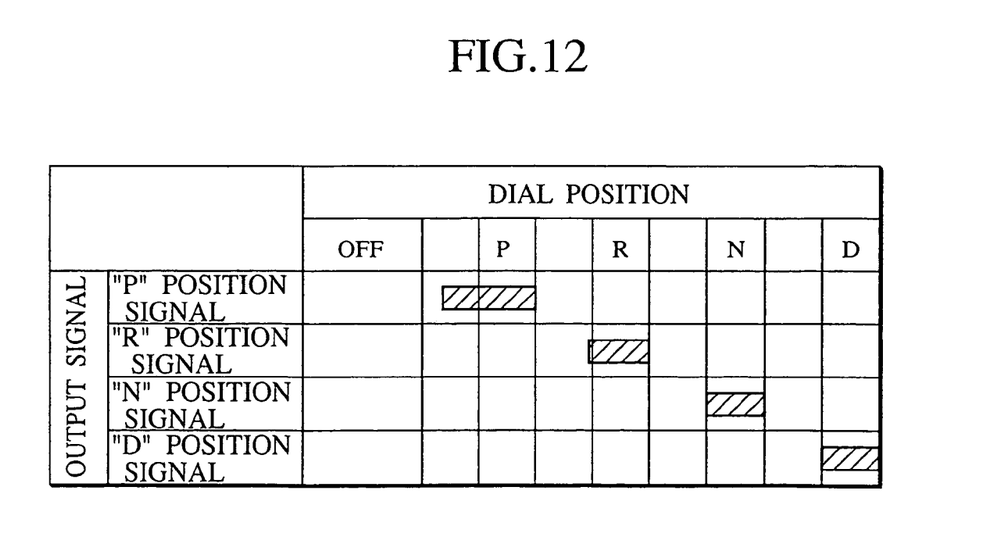
FIG. 12 is a view illustrating the relationship between a dial position of the vehicle status change-over device shown in FIG. 10 and output signals of a shift position switch.

FIG. 12 is a view illustrating the relationship between the dial position of the vehicle status change-over device shown in FIGS. 10 and 11 and output signals of the shift position switch. When the dial 43 assumes the position in a hatched area, the shift position switch 42 is operative to produce each position signal. That is, when the dial 43 assumes the "OFF" position, the shift position switch 42 is inoperative to produce the position signal. Further, when the dial 43 assumes the "P", "R", "N" and "D" positions, the shift position switch 42 produces a "P" positional signal, a "R" position signal, a "N" position signal and a "D" position signal. Further, when the dial 43 assumes an intermediate position among the "OFF" display position, the "P" display position, the "R" display position, the "N" display position and the "D" display position, the shift position switch 42 is inoperative to produce the position signals. Also, when the dial 43 is slightly rotated with the shift position switch 42 remaining in the "OFF" position, the shift position switch 42 is operative to produce an inquiry start signal.

Figure 13:
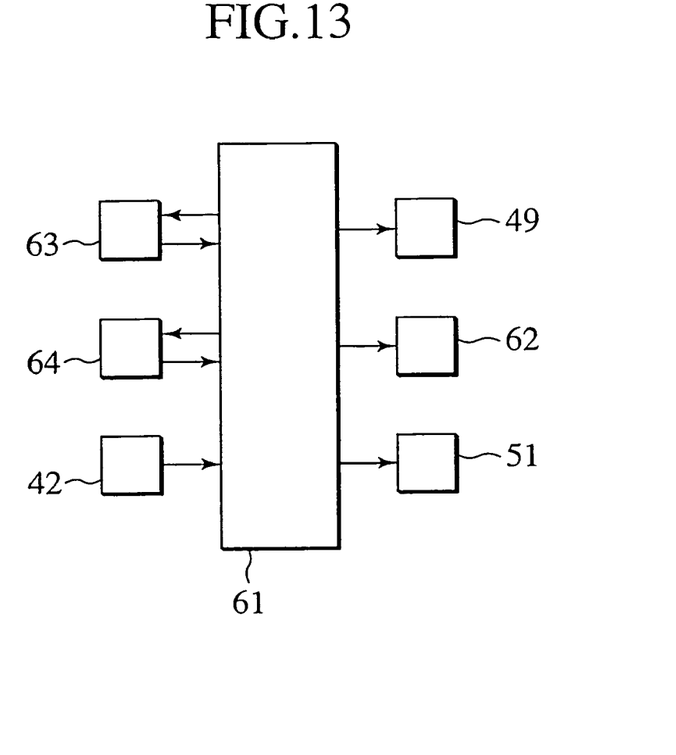
FIG. 13 is a circuit diagram of the vehicle status change-over device shown in FIGS. 10 and 11.
Figure 14:
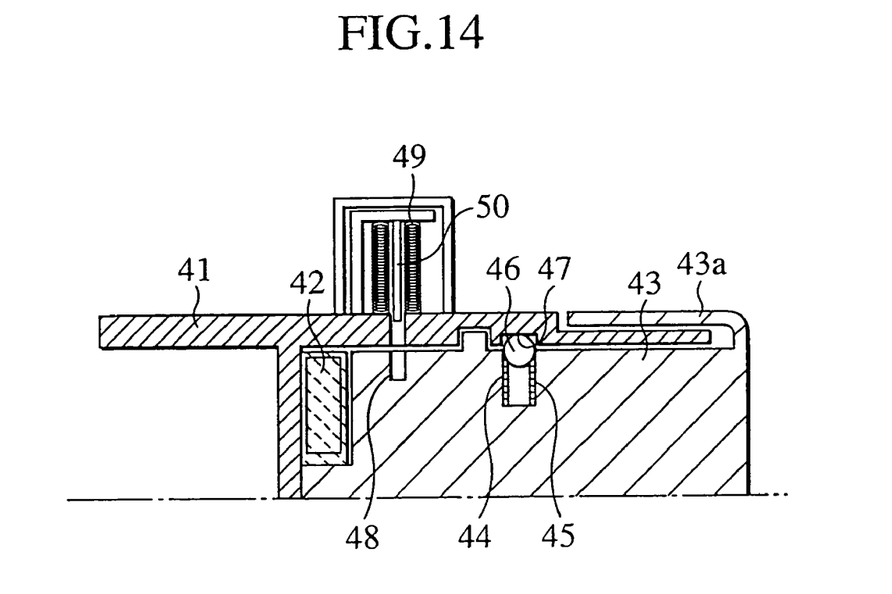
FIG. 14 is a view illustrating an operation of the vehicle status change-over device shown in FIGS. 10, 11 and 13.

FIG. 13 is a circuit diagram of the vehicle status change-over device shown in FIG. 11. As shown in FIG. 13, a shift control unit 61 is connected to the shift position switch 42, the shift lock solenoid 49, the indicator 51, a shift change-over actuator 62, an ID inquiry device 63 and an engine control 64. the inquiry start signal is outputted from the shift position switch 42, and when an electronic card key (with a communicating function) is placed within a given distance from the ID inquiry device 63, the ID inquiry device 63 is operative to read out the ID information from the electronic card key. Further, the operation is executed to discriminate whether or not the read out ID information is in coincidence with given ID information, and when the read out ID information coincides with the given ID information, a rotation available signal is outputted to the shift control unit 61. Further, when the rotation available signal is outputted from the ID inquiry device 63, the shift control unit 61 operates the shift lock solenoid 49. That is, as shown in FIG. 10, when the rotation available signal is not outputted from the ID inquiry device 63, the lock pin 50 is not attracted with the shift lock solenoid 49. In contrast, as shown in FIG. 14, when the rotation available signal is outputted from the inquiry device 63, the lock pin 50 is attracted with the shift lock solenoid 49. Further, when the shift position switch 42 assumes the "P" position, the shift control unit 61 outputs an engine start-up signal to the engine control unit 64. And, when the engine control unit 64 receives the engine start-up signal from the shift control unit 61, the engine control unit 64 is operative to start up the engine (not shown).

Figure 15:
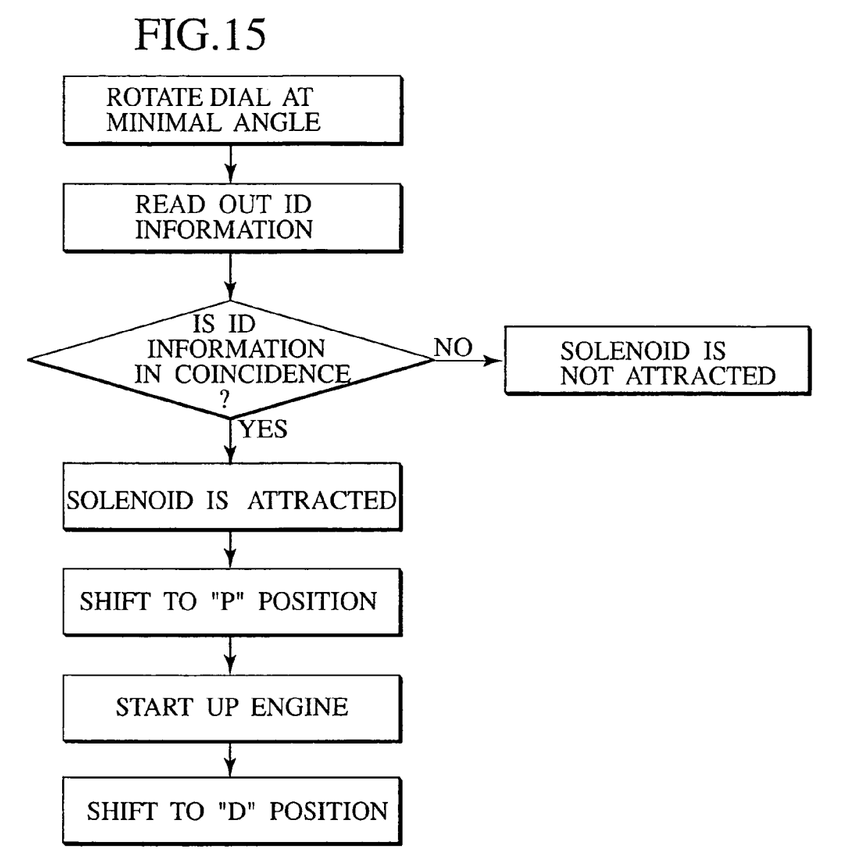
FIG. 15 is a flow chart for illustrating an operation of the vehicle status change-over device shown in FIGS. 10, 11 and 13.

Now, the operation of the vehicle status change-over device shown in FIGS. 10 to 13 is described below with reference to FIG. 15. First, when a driver, who holds the electronic card key, slightly rotates the dial 43 (with a minimal rotation), the inquiry start signal is outputted from the shift position switch 42. Then, the ID inquiry device 63 reads out the ID information from the electronic card key, and discrimination is made as to whether or not the read out ID information coincides with the given ID information which is preliminarily stored. And, when the read out ID information coincides with the given ID information, the rotation available signal is outputted to the shift control unit 61. Then, as shown in FIG. 14, the lock pin 50 is attracted with the shift lock solenoid 49 and, hence, the driver is enabled to freely rotate the dial 43. And, when the driver rotates the dial 43 in a direction from the "OFF" display position to the "P" display position, the shift position switch 42 comes to assume the "P" position. And, the shift control unit 61 outputs the engine start-up signal to the engine control unit 64, causing the engine control unit 64 to start up he engine. Under such a condition, as the driver rotates the dial 43 from the "P" position to the "D" position, the shift position switch 42 assumes the "D" position, enabling the vehicle to move forward. On the contrary, if the read out ID information is out of coincidence with the given ID information, the rotation available signal is not outputted to the shift control unit 61 and, as shown in FIG. 10, the lock pin 50 remains in the condition where it is not attracted with the shift lock solenoid 49. Accordingly, the driver is disenabled to rotate the dial 43, resulting in an inability of starting up the engine.

With such a vehicle status change-over device, merely rotating the dial 43 enables the engine to be started up while providing a capability of achieving a shift change-over. Consequently, since the operation is easy to perform and there is no need for the space to be provided for parallel movement of the ignition key, there is an increased degree of freedom in a layout of the shift operating section of the vehicle status change-over.

Figure 16:
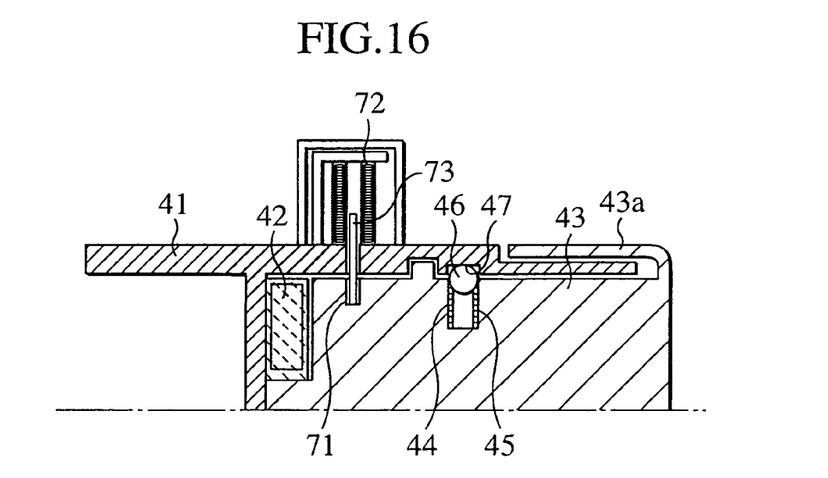
FIG. 16 is a half cross sectional view illustrating a fourth embodiment of a vehicle status change-over device according to the present invention.
Figure 17:
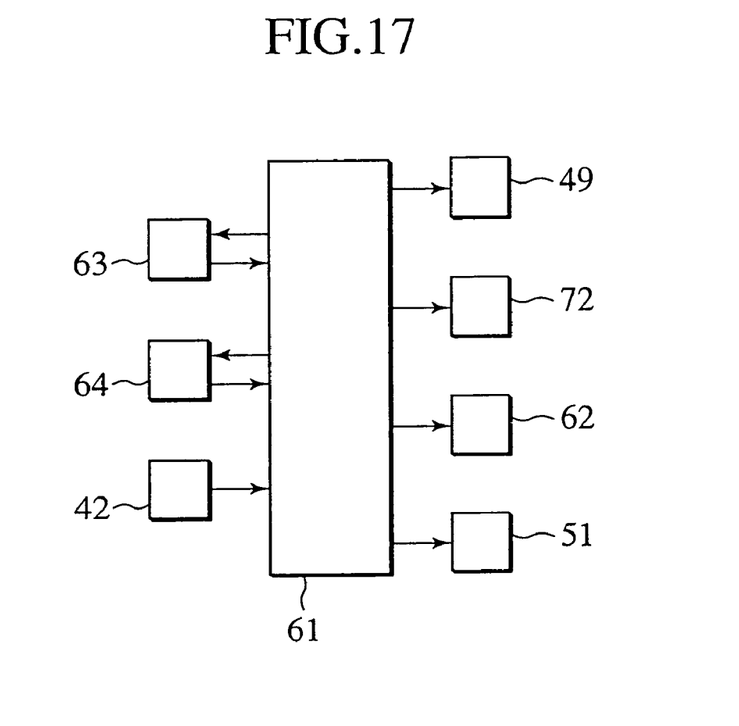
FIG. 17 is a circuit diagram of the vehicle status change-over device shown in FIG. 16.
Figure 18:
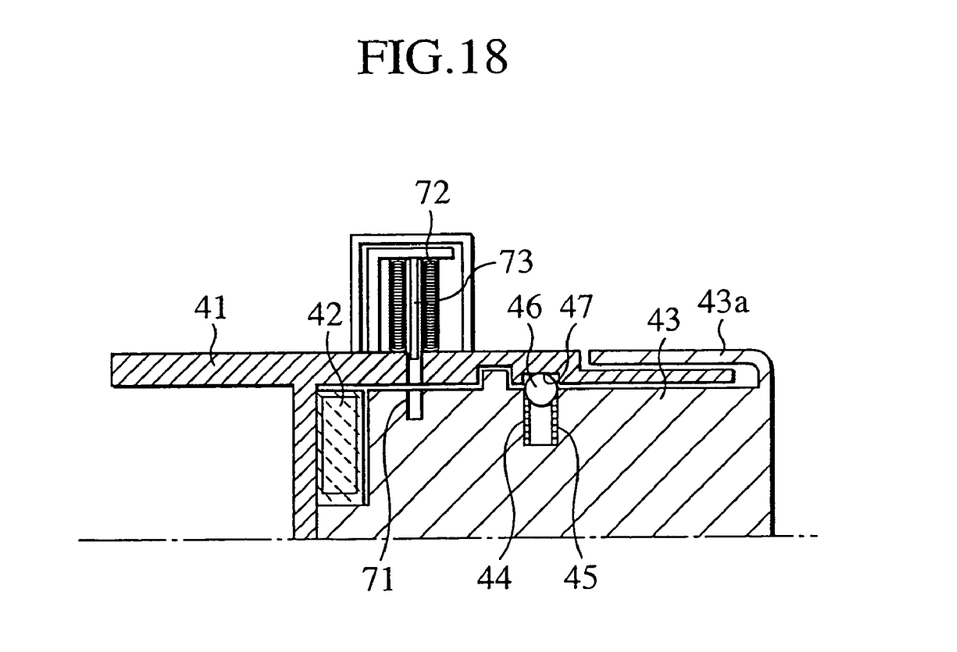
FIG. 18 is a view illustrating an operation of the vehicle status change-over device shown in FIGS. 16 and 17.

FIG. 16 is a half cross sectional view illustrating a fourth embodiment of a vehicle status change-over device according to the present invention. Further, FIG. 17 is a view illustrating a portion of the vehicle status change-over device shown in FIG. 16. As shown in FIGS. 16 and 17, further, the outer periphery of the dial 43 is formed with a bore 71. And, a shift lock solenoid 72 is mounted to the outer periphery of the case 41 at an area corresponding to the bore 71 when the shift position switch 42 assumes the "P" position, and a lock pin 73 is inserted through the case 41 to be moveable with the shift lock solenoid 72. Also, as shown in FIG. 16, even under a condition where the lock pin 73 is not attracted with the shift lock solenoid 72, the dial 43 is enabled to rotate from the "OFF" position to the "P" display position. Further, when the engine control unit 64 starts up the engine and the rotational speed of the engine exceeds a given value, an engine start-up completion signal is outputted from the engine control unit 64 to the shift control unit 61. Also, the shift lock solenoid 72 is connected to the shift control unit 61, and when the engine start-up completion signal is outputted from the engine control unit 64, the shift control unit 61 operates the shift lock solenoid 72. That is, as shown in FIG. 16, when the engine start-up completion signal is not outputted from the engine control unit 64, the lock pin 73 is not attracted with the shift lock solenoid 72. On the contrary, as shown in FIG. 18, when the engine start-up completion signal is outputted from the engine control unit 64, the lock pin 73 is attracted with the shift lock solenoid 72. And, the bore 71, the shift lock solenoid 72 and the lock pin 73 form a shift lock section that precludes the rotation of the dial 43 in a case where the engine rotational speed does not exceed the given value. Also, though not shown, the presently filed embodiment also includes the second shift lock section like in the embodiment of FIGS. 10 to 14.

Figure 19:
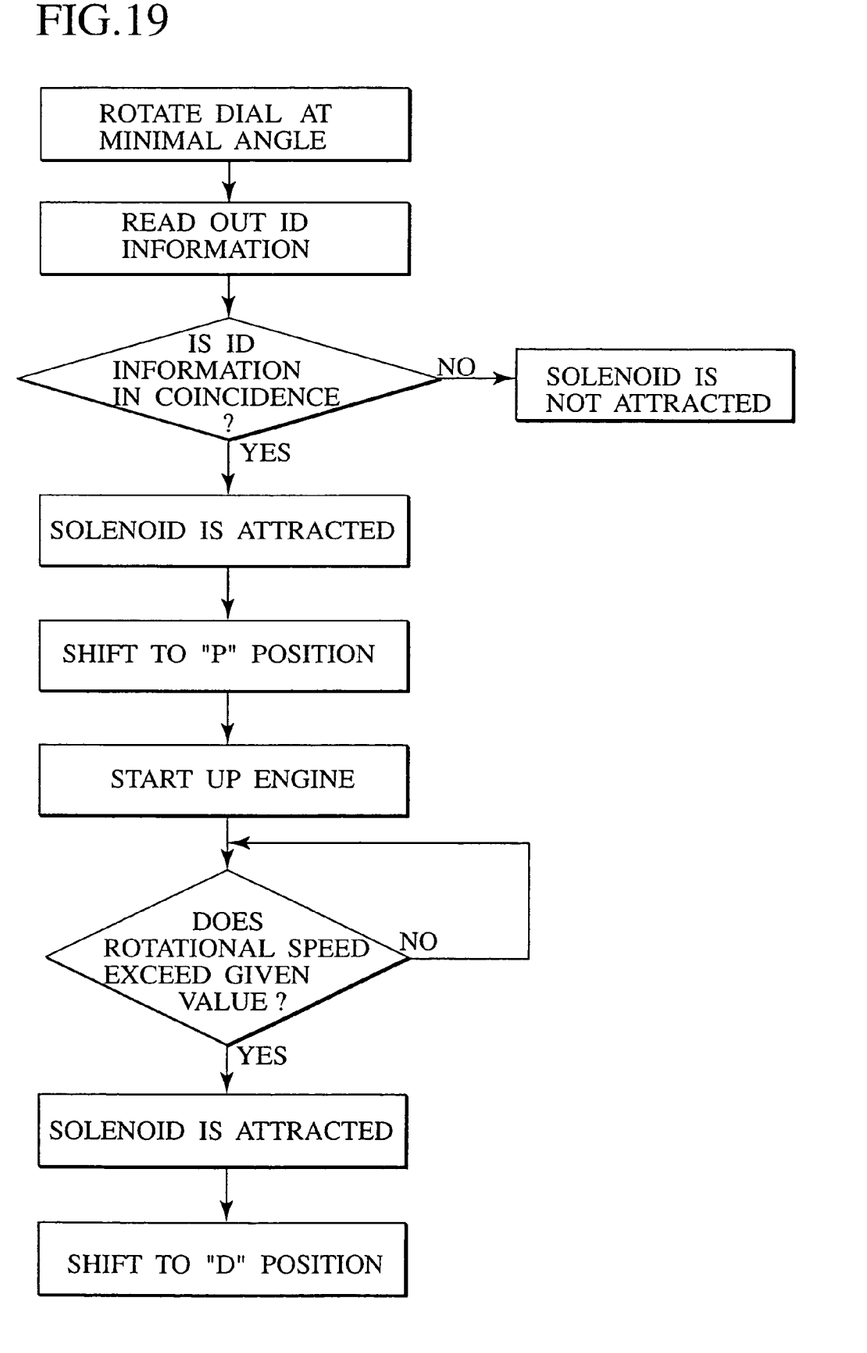
FIG. 19 is a flow chart for illustrating an operation of the vehicle status change-over device shown in FIGS. 16 and 17.

Now, the operation of the vehicle status change-over device shown in FIGS. 16 and 17 is described below with reference to FIG. 19. First, when the driver, who holds the electronic card key, slightly rotates the dial 43 (with a minimal rotation), the ID inquiry device 63 reads out the ID information from the electronic card key, and discrimination is made as to whether or not the read out ID information coincides with the given ID information which is preliminarily stored. And, when the read out ID information coincides with the given ID information, the rotation available signal is outputted to the shift control unit 61. Then, as shown in FIG. 14, the lock pin 50 is attracted with the shift lock solenoid 49 and, hence, the driver is enabled to rotate the dial 43 to the "P" display position. When the driver rotates the dial 43 in a direction from the "OFF" display position to the "P" display position, the shift position switch 42 comes to assume the "P" position, and the shift control unit 61 outputs the engine start-up signal to the engine control unit 64, causing the engine control unit 64 to start up he engine. And, when the engine rotational speed exceeds the given value and the engine start-up completion signal is outputted from the engine control unit 64 to the shift control unit 61, the lock pin 73 is attracted with the shift lock solenoid 72 as shown in FIG. 18. Thus, the driver is able to freely rotate the dial 43 and, under such condition, if the driver rotates the dial 43 from the "P" display position to the "D" display position, the shift position switch 42 assumes the "D" position, enabling the vehicle to move forward. In contrast, when the read out ID information does not coincide with the given ID information, since the rotation available signal is not outputted to the shift control unit 61, the lock pin 50 remains in the condition in which it is not attracted with the shift lock solenoid 49 as shown in FIG. 10, resulting in an inability for the driver to rotate the dial 43 with a resultant difficulty in starting up the engine.

With such a vehicle status change-over device, only under a condition where the engine rotational speed exceeds the given value, the shift position switch 42 is enabled to be located in a drive position such as the "D" position. That is, since the shift position switch 42 is rotated from the "OFF" position to the "P" position and, after the engine has been completely started up, the shift position switch 42 is moveable from the "P" position to the "R" position, it is possible to preclude the operation of the engine from being interrupted during the start-up operation of the engine.

Also, while in the embodiment shown in FIGS. 1 to 6 and the embodiment shown in FIGS. 7 to 9, an example has been shown in which the rotator includes the rotational member to allow the ignition key to be inserted to the key hole of the rotator of the key cylinder to rotate the same for thereby starting up the engine, whereas, in recent years, a technology is known in which such a mechanical key is not in use and an ID inquiry is made between the electronic card key carried by an occupant and an associated ID inquiry device installed in the vehicle to discriminate a proper owner when an inquiry result is obtained in coincidence for thereby allowing the rotational operating knob of the vehicle to be rotated to allow the engine to be rotated, the presence of the rotational operating knob and a portion, rotational with accompanying rotation of the rotational operating knob, which are composed of the rotational member enables the present invention to be applied such a device.

Further, while in the embodiment shown in FIGS. 7 to 9, the ignition key 38 has been shown as being completely accommodated in the case 5, it is needless to say that the ignition key need not be completely accommodated in the case. While in the embodiment shown in FIGS. 10 to 15 and the embodiment shown in FIGS. 16 to 19, the electronic key has been described as employing the electronic card key, other electronic keys may be employed.

Also, the embodiments in the foregoing description has been described for providing an ease of understanding the present invention but not for limiting the present invention. Consequently, various elements disclosed in the above described embodiments are contemplated to cover all design modifications and equivalents which fall within the scope of the present invention.

INDUSTRIAL APPLICABILITY

As set forth above, with the first aspect of the present invention, rotation of the rotational member enables the engine to be started up and rotation of the rotational member rotatable about the center substantially aligned with the rotational center of the rotational member enables the shift position to be selected. As a result, since it is possible to perform the operation, before beginning the travel of the vehicle between the start-up of the engine and the selecting operation of the shift position, with the single hand in one identical operation, it is easy to implement the operation. Further, since the rotation of the dial enables the shift of the power transmission to be changed over, there is no need for the space for the parallel movement of the ignition key, resulting in the increased degree of freedom in the layout of the shift operating section of the vehicle status change-over device.

In addition, according to the first aspect of the present invention, when the ignition switch remains in the engine start-up interruptive condition, since the rotation of the dial is disabled, enabling the dial from being erroneously operated.

In addition, according to the first aspect of the present invention, in an event that the shift position switch assumes the position except for the parking position, since the rotational member has the retaining section that holds the side wall, closer to the vehicle compartment, of the rotational member in the retracted position, when rotating the dial, disposed around the periphery of the rotational member, after start-up of the engine by rotating the rotational member, the operation is not interrupted with the key inserted to the rotational member, resulting in a capability for the operation to be smoothly performed.

In addition, with the first aspect of the present invention, since the retaining section is released when the shift position switch assumes the parking position to permit the position of the rotational member to be restored to the original position, it is possible for the rotational member to smoothly select the operation of the engine start-up interruptive condition.

Further, with the second aspect of the present invention, since mere rotation of the rotational member enables the engine to be started up while enabling the shift change-over to be undertaken, the operation becomes easy to perform. Also, no space the parallel movement of the ignition key is required, resulting in the increased degree of freedom for the layout of the shift operating section of the vehicle change-over device.

In addition, with the first aspect of the present invention, since the shift position switch is enabled to assume the drive position only when the engine rotational speed exceeds the given value, it is possible to preclude the engine from being halted during the engine start-up.

The invention claimed is:

1. A vehicle status change-over device comprising:
   a rotational member rotatable about a center of a given rotational axis;
   an ignition switch operative to select at least an engine start-up interruptive status and an engine start-up permit status in dependence on a rotational position of the rotational member;
   a dial located for rotational movement about a center on the substantially same line as a rotational center of the rotational member;
   a shift position switch selecting a shift position of a power transmission in dependence on a rotational position of the dial; and
   a retaining section retaining a side wall, closer to a vehicle compartment, of the rotational member at a retracted position when the shift position switch assumes a position other than a parking position.

2. The vehicle status change-over device according to claim 1, further comprising:
   a shift lock section which prevents the dial from being rotated when the ignition switch selects the engine start-up interruptive status.

3. The vehicle status change-over device according to claim 2, wherein:
   the shift lock section includes a bore portion formed on an outer periphery of the dial, a shift lock solenoid mounted to an outer periphery of a support member, that supports the dial for rotational movement, at an area corresponding to the bore portion, and a lock pin adapted to be moved with the shift lock solenoid and extending through the support member.

4. The vehicle status change-over device according to claim 1, wherein:
   the retaining section is operative to be released when the shift position switch assumes the parking position.

5. A vehicle status change-over device comprising:
   a dial disposed for rotational movement;
   a shift position switch selecting a shift position of a power transmission in dependence on a rotational position of the dial;
   a first shift lock section operative to prevent the dial from being rotated to retain the shift position switch in an off position and to release the off position of the shift position switch when ID information of an electronic key coincides with given ID information;
   an engine control unit operative to start up an engine when the shift position switch assumes a parking position; and
   a second shift lock section operative to prevent the dial from being rotated when a rotational speed of the engine is below a given value.

6. A vehicle status change-over device comprising:
   a rotational member rotatable about a center of a given rotational axis;
   an ignition switch operative to select at least an engine start-up interruptive status and an engine start-up permit status in dependence on a rotational position of the rotational member;
   a dial located for rotational movement about a center on the substantially same line as a rotational center of the rotational member;
   shift position selecting means for selecting a shift position of a power transmission in dependence on a rotational position of the dial; and
   retaining means for retaining a side wall, closer to a vehicle compartment, of the rotational member at a retracted position when the shift position switch assumes a position other than a parking position.

7. A vehicle status change-over device comprising:
   a dial located for rotational movement;
   shift position selecting means for selecting a shift position of a power transmission in dependence on a rotational position of the dial;
   first shift lock section means operative to prevent the dial from being rotated to retain the shift position switch in an off position and to release the off position of the shift position switch when ID information of an electronic key coincides with given ID information;
   engine control means operative to start up an engine when the shift position selection means assumes a parking position; and
   second shift lock means operative to prevent the dial from being rotated when rotational speed of the engine is below a given value.

* * * * *